July 19, 1927.  1,636,479
A. T. MEYER
VENTILATOR FASTENER FOR AUTOMOBILE DOORS
Filed July 30, 1926   2 Sheets-Sheet 2
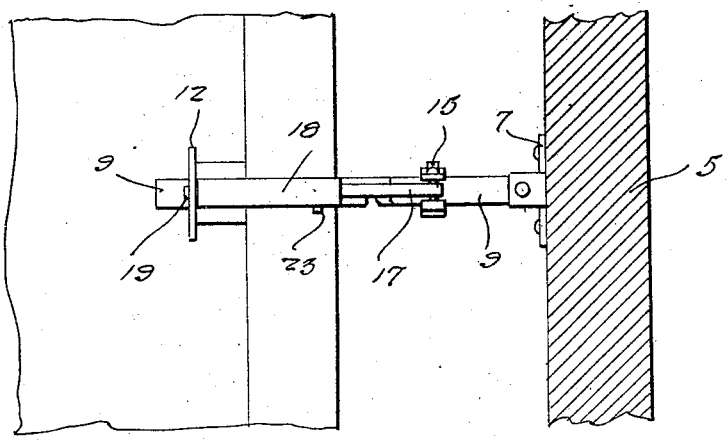
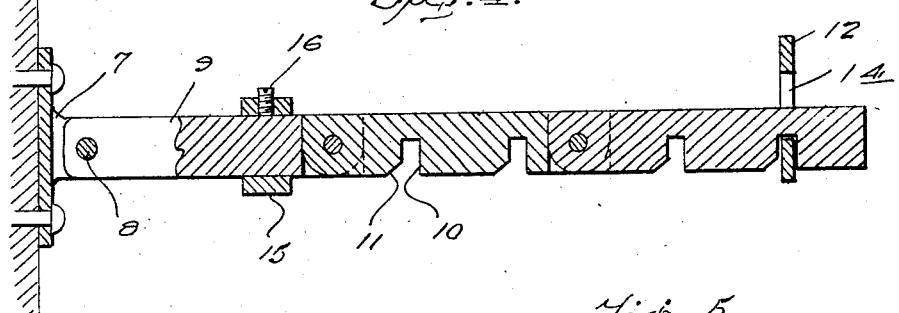
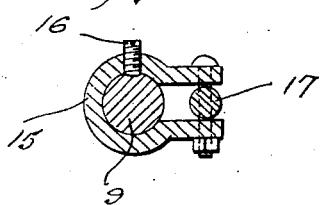
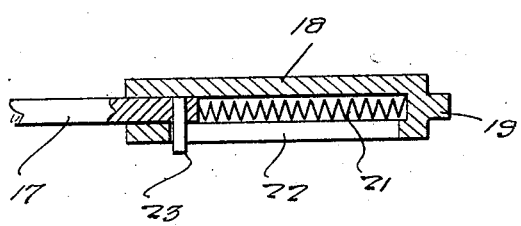
Inventor
Arthur T. Meyer
By Clarence A. O'Brien
Attorney Patented July 19, 1927.

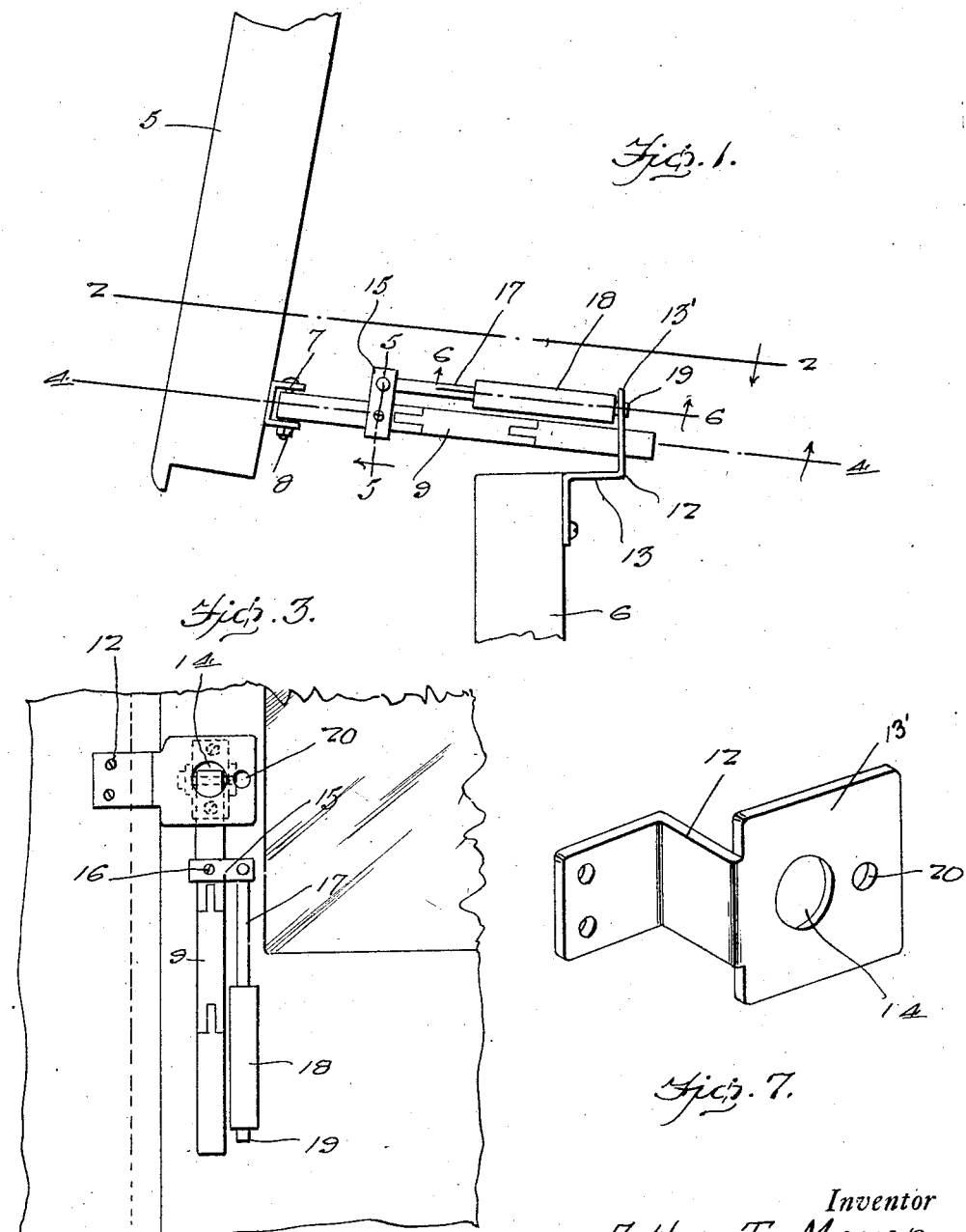

1,636,479

UNITED STATES PATENT OFFICE.

ARTHUR T. MEYER, OF CARLETON, MICHIGAN.

VENTILATOR FASTENER FOR AUTOMOBILE DOORS.

Application filed July 30, 1926. Serial No. 126,047.

This invention relates generally to closure fasteners and has more particular reference to a ventilator fastener for automobile doors, the primary object of the invention residing in the provision of means whereby the doors of automobiles, particularly those of the closed type, may be latched in a predetermined open position so that the interior of the car may be properly ventilated.

One of the foremost objects of the invention resides in the provision of a fastener of this character that may be readily applied to the automobile without marring the same and that when so applied will not materially detract from the appearance of the automobile.

A further and important object is to provide a ventilator fastener for automobile doors that may be readily swung out of locking position when it is not necessary to use the same for the purposes intended.

The final salient object of the invention is to provide a fastener of this character wherein even though the door is in a retained open position, the same may be readily closed or moved to open position without requiring any unusual effort, and without necessitating the manipulation of complicated mechanism.

Other objects will become apparent as the nature of the invention is better understood, the same comprising the novel form, combination, and arrangement of parts hereinafter more fully described, shown in the accompanying drawing and claimed.

In the drawing wherein like numerals indicate like parts:

Figure 1 is a view in top plan of my improved ventilator fastener for auto doors, the same being shown as being actually installed and in use in maintaining an automobile door in partially open position.

Figure 2 is an inner side elevation thereof taken substantially upon the line 2—2 of Figure 1, the door being disclosed in cross section.

Figure 3 is a fragmentary view of the inner side of the door as well as the frame, disclosing the present fastener properly installed and in position out of use.

Figure 4 is an enlarged longitudinal section taken substantially upon the line 4—4 of Figure 1, for more clearly disclosing the section or bar pivotally attached to the inner side of the door, and the bar retainer plate rigidly secured to the door frame.

Figure 5 is an enlarged transverse section taken substantially upon the line 5—5 of Figure 1 for more clearly disclosing a spring clamp for adjustable arrangement upon the inner end of said pivotal bar which clamp serves as a pivotal attaching means for a spring pressure device employed for preventing the accidental displacement of the fastener when the same is employed in securing the door in predetermined open position.

Figure 6 is an enlarged detail longitudinal section of the outer end of said spring device, and Figure 7 is a detail perspective view of the bracket which is adapted to be secured to the door frame.

Now having particular reference to the drawings, 5 indicates a hinged door of an automobile body, and 6 the bar of the door frame adjacent the free edge of said door. The invention per se contemplates the provision of a suitable metallic bracket 7 that is rigidly secured to the inner side of the door 5 adjacent its free edge as clearly disclosed in Figures 1 and 2.

Secured on a horizontal pivot 8 to this bracket is the inner end of a vertically swinging bar 9 consisting of three or more hinged sections as clearly disclosed in Figure 4. The hinged connections between the outermost section of this bar is such as to prevent the upward swinging movement of said outer sections with respect to the inner section that is pivoted to the bracket 7, but to permit the downward swinging movement thereof. This form of hinged joint is well known and a detailed description thereof is not believed necessary. Formed upon the under side of the outermost sections of said bar are predetermined spaced vertical notches 10, the inner edges of which are tapered at 11, in Figure 4, for a purpose hereinafter to be more fully described.

Rigidly secured to the inner side of the bar 6 of the door frame is a bracket 12 that is so shaped as to extend inwardly as at 13, and thence laterally towards the door opening as at 13'. At the inner edge of this lateral portion 13' of said bracket is a circular opening 14 through which the pivotal bar 9 may freely extend. Obviously, the inner end of the bar may be disposed within the opening 14 of said bracket after the door has been partially opened and then moved to a closed position. By swinging either the outer section to this bar in a downward direction one of the notches thereof will engage the lower edge of the opening 14 in said bracket 12 for maintaining the door in predetermined open position.

For preventing vertical or other movement of the bar within the opening 14 of the bracket when the device is in use for maintaining the door 5 in a predetermined opened position, there is provided a means for tending to normally force the door 5 in an outward direction for consequently binding the lower edge of the bracket opening within the predetermined notch of the bar. This means consists of a spring clamp 15 slidably arranged upon the innermost section of the bar 9 and secured in predetermined adjusted position thereon by reason of a set screw 16, Figures 4 and 5. Pivoted to said spring clamp at the side of the bar 9 remote from the edge of the door frame member 6 is a pin 17 that is slidably arranged within a cylinder 18 which cylinder is closed at its outer end and provided with a circular lug 19 for engagement within a small opening 20 adjacent the outer edge of the laterally extending portion 13' of said bracket 12, as shown in Figures 1 and 2. Arranged within the cylinder 18 between the closed end thereof and the inner end of the pin 17 is an expansible coil spring 21. Said cylinder 18 is formed upon its bottom side with a longitudinal slot 22 through which engages a pin 23 arranged laterally upon the inner end of the pivotal pin 17, said pin and slot being obviously for the purpose of preventing the disengagement of the cylinder 18 from the pin 17 when the lug 19 upon the end of the cylinder is removed from the opening 20 in the bracket 12.

The detailed operation of a lock of this character will be readily appreciated by those skilled in the art when considering the drawings in accompaniment with the foregoing specification, and even though I have herein shown and described but a single embodiment of the present invention it is nevertheless to be understood that other forms may be had without affecting the spirit and scope of the appended claims.

Having thus described the invention, what I claim as new and desire to secure by Letters Patent is:—

1. In a ventilator fastener for automobile doors, a bar pivotally connected at one end to the inner side of the door adjacent its free edge, a laterally extending bracket secured to the inner side of the door frame and having an opening for receiving said bar, said bar being formed at its under side with notches for engaging the edge of the opening for providing an interlocking connection between the bar and bracket, means for normally forcing the door in an outward direction whereby the bar will be maintained in frictional interlocked engagement with said bracket, said means consisting of a telescopic pin and cylinder, said pin being pivotally secured to said bar and said cylinder having means for attachment to the bracket, and an expansion spring arranged within the cylinder in back of said pin.

2. In a ventilator fastener for automobile doors, a bar pivotally secured at one end to the inner side of the door, and having notches formed in the lower edge thereof, a laterally extending bracket secured to the adjacent side of the door frame and having an opening therein for receiving said bar, the notches formed in the pivoted bar being adapted for engagement within the edge of said bracket opening, and means arranged between the bar and the bracket for normally forcing the door outwardly, whereby the bar will be maintained in frictional interlock engagement with the bracket, said means comprising a pin, a clamp pivotally secured to one end of the pin and adapted to be adjustably secured on said bar, a cylinder in which the free end of said pin is slidable, said cylinder being formed with a longitudinal slot, a member projecting laterally from the free end of the pin and operable within said slot, an expansible coil spring arranged within the cylinder and disposed between the free end of said pin and the closed outer end of the cylinder, a lug formed on the outer closed end of the cylinder, said aforementioned bracket being provided with an opening for the reception of said lug.

In testimony whereof I affix my signature.

ARTHUR T. MEYER.